(12) United States Patent
Chhibber et al.

(10) Patent No.: US 11,655,174 B2
(45) Date of Patent: May 23, 2023

(54) SYSTEM AND METHOD FOR TREATING CONTAMINATED WATER

(71) Applicant: Kewest Equipment Corp., Edmonton (CA)

(72) Inventors: Anil Kumar Chhibber, Edmonton (CA); Peter Stewart Forbes, Edmonton (CA); Vishal Soni, Edmonton (CA); Harjot Brar, Edmonton (CA); Kurt Wilhelm Klingbeil, Edmonton (CA)

(73) Assignee: Kewest Equipment Corp., Edmonton (CA)

( * ) Notice: Subject to any disclaimer, the term of this patent is extended or adjusted under 35 U.S.C. 154(b) by 0 days.

(21) Appl. No.: 17/388,623

(22) Filed: Jul. 29, 2021

(65) Prior Publication Data

US 2022/0119294 A1    Apr. 21, 2022

Related U.S. Application Data

(60) Provisional application No. 63/094,439, filed on Oct. 21, 2020.

(51) Int. Cl.
| | |
|---|---|
| C02F 9/00 | (2023.01) |
| C02F 101/10 | (2006.01) |
| C02F 1/72 | (2023.01) |
| C02F 3/08 | (2023.01) |
| C02F 1/74 | (2023.01) |

(Continued)

(52) U.S. Cl.
CPC .......... *C02F 9/00* (2013.01); *C02F 1/32* (2013.01); *C02F 1/722* (2013.01); *C02F 1/725* (2013.01); *C02F 1/727* (2013.01); *C02F 1/74* (2013.01); *C02F 1/78* (2013.01); *C02F 3/08* (2013.01); *C02F 3/1268* (2013.01); *C02F 2101/101* (2013.01); *C02F 2301/046* (2013.01); *C02F 2305/026* (2013.01); *C02F 2305/10* (2013.01)

(58) Field of Classification Search
None
See application file for complete search history.

(56) References Cited

U.S. PATENT DOCUMENTS

| | | |
|---|---|---|
| 5,709,799 A | 1/1998 | Engelhard |
| 8,337,759 B1 | 12/2012 | Alford et al. |

(Continued)

OTHER PUBLICATIONS

Tzvi et al.: "Highly efficient method for oxidation of dissolved hydrogen sulfide in water, utilizing a combination of UVC light and dissolved oxygen", Journal of Photochemistry & Photobiology A: Chemistry 372 (2019) 63-70; journal homepage: www.elsevier.com/locate/photochem, Jul. 8, 2018.

*Primary Examiner* — Chester T Barry
(74) *Attorney, Agent, or Firm* — Rowand LLP

(57) ABSTRACT

A method and system for treating contaminated water are described. The method comprises receiving, in a first chamber, contaminated water with injection of a modifier; in a first chamber, treating the contaminated water with at least one of air or oxygen and simultaneously treating the contaminated water with ultraviolet radiation; in a second chamber, receiving fluid from the first chamber and treating the received fluid with at least one of oxygen or ozone; in a third chamber, receiving fluid from the second chamber and treating the received fluid with ultraviolet radiation; and discharging water from the third chamber using a discharge pump.

18 Claims, 2 Drawing Sheets

(51) Int. Cl.
*C02F 1/78* (2023.01)
*C02F 1/32* (2023.01)
*C02F 3/12* (2023.01)

(56) References Cited

U.S. PATENT DOCUMENTS

| | | |
|---|---|---|
| 8,753,523 B2 | 6/2014 | Harris |
| 9,193,607 B1 * | 11/2015 | Johnston ............ B01F 25/31231 |
| 2005/0171390 A1 * | 8/2005 | Felch ......................... C02F 1/72 |
| | | 568/959 |
| 2007/0196232 A1 * | 8/2007 | Klaptchuk .............. A61L 11/00 |
| | | 422/292 |
| 2012/0085691 A1 * | 4/2012 | Cummins ................. C02F 9/00 |
| | | 210/201 |
| 2013/0118994 A1 * | 5/2013 | Altman ..................... C02F 9/00 |
| | | 204/240 |
| 2018/0362374 A1 | 12/2018 | Harris |
| 2019/0084852 A1 * | 3/2019 | Harris ....................... C02F 1/78 |

* cited by examiner

SYSTEM AND METHOD FOR TREATING CONTAMINATED WATER

TECHNICAL FIELD

The present disclosure relates to systems and methods for treating contaminated water.

BACKGROUND

Contaminated waters may contain unsafe or harmful contaminants such as hydrogen sulfide ($H_2S$), dissolved organic carbons (DOC), biological (BOD) and chemical oxygen demand (COD) and hydrocarbon compounds or pathogens, etc. As such, it is difficult to meet discharge criteria for treated water.

Contaminated water may be treated using certain chemical compounds, however these chemical compounds may be expensive, not readily available and may also create unsafe or harmful compounds to the environment.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
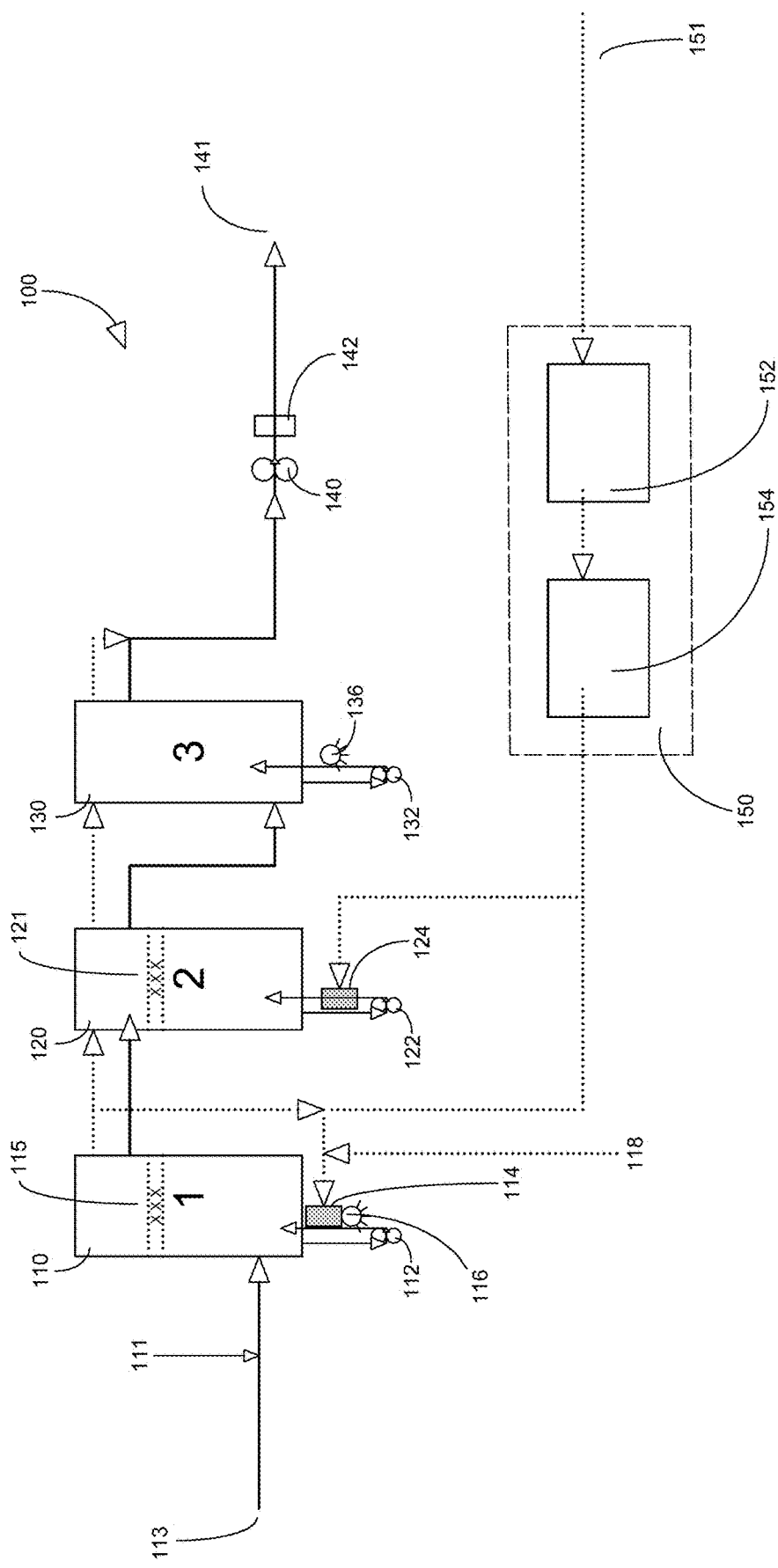
FIG. 1 is a schematic operation diagram illustrating an operating environment of a system for treating contaminated water according to an example embodiment.

Accordingly, in one aspect there is provided a method for treating contaminated water, the method comprising receiving, in a first chamber, contaminated water with injection of a modifier; in a first chamber, treating the contaminated water with at least one of air or oxygen and simultaneously treating the contaminated water with ultraviolet radiation; in a second chamber, receiving fluid from the first chamber and treating the received fluid with at least one of oxygen or ozone; in a third chamber, receiving fluid from the second chamber and treating the received fluid with ultraviolet radiation; and discharging water from the third chamber using a discharge pump.

In one or more embodiments, the method further comprises generating at least one of oxygen or ozone from air exterior of the first, second and third chambers using oxygen enrichment with ozone generation.

In one or more embodiments, the ultraviolet radiation used in the first chamber is UVC radiation defined for contaminants to be treated.

In one or more embodiments, the method further comprises recirculating the contaminated water after injection of the modifier and the at least one of air or oxygen within the first chamber using a first recirculation pumping system.

In one or more embodiments, the first recirculation pumping system includes a venturi unit.

In one or more embodiments, the method further comprises, in the second chamber, utilizing a plurality of moving bed biofilm reactor membranes to increase reaction between contaminants in the fluid and the at least one of oxygen or ozone.

In one or more embodiments, the method further comprises recirculating the fluid and the at least one of oxygen or ozone within the second chamber using a second recirculation pumping system.

In one or more embodiments, the second recirculation pumping system includes a venturi unit.

In one or more embodiments, the ultraviolet radiation used in the third chamber is ultraviolet UVC radiation defined for contaminants to be treated.

In one or more embodiments, the method further comprises recirculating the fluid within the third chamber using a third recirculation pumping system.

According to another aspect there is provided a system for treating contaminated water, the system comprising a source of at least one of air, oxygen or ozone; first, second and third chambers, the first and second chambers fluidly connected to the source of at least one of air, oxygen or ozone; the first chamber comprising an inlet to receive contaminated water with an injection of a modifier from a source and an outlet to discharge fluid to a second chamber; the second chamber comprising an inlet to receive fluid from the first chamber and an outlet to discharge fluid to the third chamber; the third chamber comprising an inlet to receive fluid from the second chamber and an outlet to discharge fluid to a discharge pump; a first ultraviolet radiation source positioned external to fluid recirculation of the first chamber to treat contaminated water contained therein; and a second ultraviolet radiation source positioned external to fluid recirculation of the third chamber to treat fluid contained therein.

In one or more embodiments, the source of at least one of air, oxygen or ozone comprises an oxygen generator unit and an ozone generator.

In one or more embodiments, the first ultraviolet radiation source emits UVC radiation.

In one or more embodiments, the second ultraviolet radiation source emits UVC radiation.

In one or more embodiments, the system further comprises a first recirculation pumping system positioned to recirculate the contaminated water and at least one of air or oxygen within the first chamber.

In one or more embodiments, the system further comprises a plurality of moving bed biofilm reactor membranes positioned within the first chamber to increase reaction between the fluid and the at least one of air or oxygen.

In one or more embodiments, the system further comprises a plurality of moving bed biofilm reactor membranes positioned within the second chamber to increase reaction between the fluid and at least one of oxygen or ozone.

In one or more embodiments, the system further comprises a second recirculation pumping system positioned to recirculate the fluid and at least one of oxygen or ozone within the second chamber.

In one or more embodiments, the system further comprises a third recirculation pumping system positioned to recirculate the fluid within the third chamber.

In one or more embodiments, the discharge pump is fluidly connected to the third chamber to discharge at least one of water or accumulated vapours therefrom.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Turning to FIG. 1, a system for treating contaminated water is shown and is generally identified by reference numeral 100. The system 100 is used to remove contaminants and/or pathogens from contaminated water received from a water source 113. The contaminated water source 113 may be well water or other waste water and may include contaminants such as hydrogen sulfide ($H_2S$), dissolved organic carbons (DOC), biological (BOD) and chemical oxygen demand (COD) and hydrocarbon compounds or pathogens etc.

The system 100 comprises a first chamber 110, a second chamber 120, a third chamber 130, a discharge pump 140 and an air source 150.

The first chamber 110 comprises a recirculation pump system 112, that may include a venturi unit 114, and an ultraviolet radiation source 116. The first chamber 110 comprises an inlet configured to receive an ingress of contaminated water from the water source 113. An injection modifier source 111 may be used to initiate selected treatment reaction(s) by injecting a modifier such as for example hydrogen peroxide ($H_2O_2$) or Fenton Reagent. As will be appreciated, the modifier may be selected based on the contaminant(s) of the contaminated water. The first chamber 110 also comprises an outlet configured to direct the egress of fluid from the first chamber 110 to the second chamber 120. The first chamber 110 is fluidly coupled to an air source 118 and the air source 150 and receives air and/or oxygen ($O_2$) therefrom.

In this embodiment, a plurality of moving bed biofilm reactor membranes 115 are utilized to increase or enhance reaction between the fluid and oxygen ($O_2$) within the first chamber 110. Specifically, moving bed biofilm reactor membranes 115 are submerged in the fluid within the first chamber 110.

The recirculation pump system 112 is positioned to recirculate contaminated water or fluid contained within the first chamber 110. In this embodiment, the recirculation pump system 112 includes the venturi unit 114 and is used to receive air from the air source 118 and/or oxygen ($O_2$) from the air source 150 for treating the contaminated water contained within the first chamber 110.

The ultraviolet radiation source 116 is positioned to emit UVC radiation into the recirculating fluid of the first chamber 110 to catalyze oxidation reactions with the contaminated water contained therein. In this embodiment, the ultraviolet radiation source 116 emits ultraviolet radiation at a wavelength which may be referred to as UVC radiation. An example wavelength is 254 nm. It will be appreciated that other wavelengths may be used and that the wavelength used may be dependent on the contaminants contained in the contaminated water. The ultraviolet radiation enhances oxidation of the contaminated water by generating hydroxyl radicals therein.

Within the first chamber 110, contaminated water is treated with air and/or oxygen ($O_2$) received from the air source 118 and the air source 150 as well as the ultraviolet radiation emitted from the ultraviolet radiation source 116.

The second chamber 120 comprises a recirculation pump system 122, that includes a venturi unit 124. The second chamber 120 comprises an inlet configured to receive an ingress of fluid from the first chamber 110. The second chamber 120 also comprises an outlet configured to direct the egress of fluid from the second chamber 120 to the third chamber 130. The second chamber 120 is fluidly coupled to the air source 150 and receives oxygen ($O_2$) and/or ozone ($O_3$) therefrom.

The recirculation pump system 122 is positioned to recirculate fluid contained within the second chamber 120. In this embodiment, the recirculation pump system 122 includes the venturi unit 124 and is used to receive oxygen ($O_2$) and/or ozone ($O_3$) from the air source 150 and dissolves the received oxygen ($O_2$) and/or ozone ($O_3$) in fluid contained within the second chamber 120.

In this embodiment, a plurality of moving bed biofilm reactor membranes are utilized to increase or enhance reaction between contaminants in the fluid and the oxygen ($O_2$) and/or ozone ($O_3$) within the second chamber 120. Specifically, moving bed biofilm reactor membranes 121 are submerged in the fluid within the second chamber 120.

Within the second chamber 120, fluid received from the first chamber 110 is treated with the oxygen ($O_2$) and/or ozone ($O_3$) received from the air source 150. The oxidation reaction within the second chamber 120 is increased or enhanced by the plurality of moving bed biofilm reactor membranes 121.

The third chamber 130 comprises a recirculation pump system 132 and an ultraviolet radiation source 136. The third chamber 130 comprises an inlet configured to receive an ingress of fluid from the second chamber 120. The third chamber 130 also comprises an outlet configured to direct the egress of fluid from the third chamber 130 to the discharge pump 140.

The recirculation pump system 132 is positioned to recirculate fluid contained within the third chamber 130 to increase or enhance the reaction between the fluid and the ultraviolet radiation source 136.

The ultraviolet radiation source 136 is positioned to emit UVC radiation into the recirculating fluid of the third chamber 130 to treat fluid contained therein. In this embodiment, the ultraviolet radiation source 136 emits ultraviolet radiation at a wavelength which may be referred to as UVC radiation. An example wavelength is 254 nm. It will be appreciated that other wavelengths may be used and that the wavelength used may be dependent on the contaminants contained in the contaminated water. The ultraviolet radiation enhances oxidation of the fluid by generating hydroxyl radicals therein.

The discharge pump 140 comprises an inlet to receive an ingress of water and accumulated vapours from the third chamber 130. The discharge pump 140 comprises an outlet to direct the egress of water and excess vapour out of the third chamber 130. The discharge pump 140 may be used to deliver the treated water according to local quality specifications based on the receiving environment 141. The discharge pump 140 may alternatively discharge the treated water to a storage tank.

The air source 150 may be referred to as an oxygen and/or ozone generation system and provides oxygen ($O_2$) and/or ozone ($O_3$) to the recirculation pump systems 112 and 122 with venturi units 114, 124, respectively. The air source 150 comprises an oxygen generator unit 152 and an ozone generator 154. The oxygen generator unit 152 receives air from the surrounding environment 151 and provides oxygen to the ozone generator 154. The ozone generator 154 partially converts the received oxygen to ozone.

Figure 2:
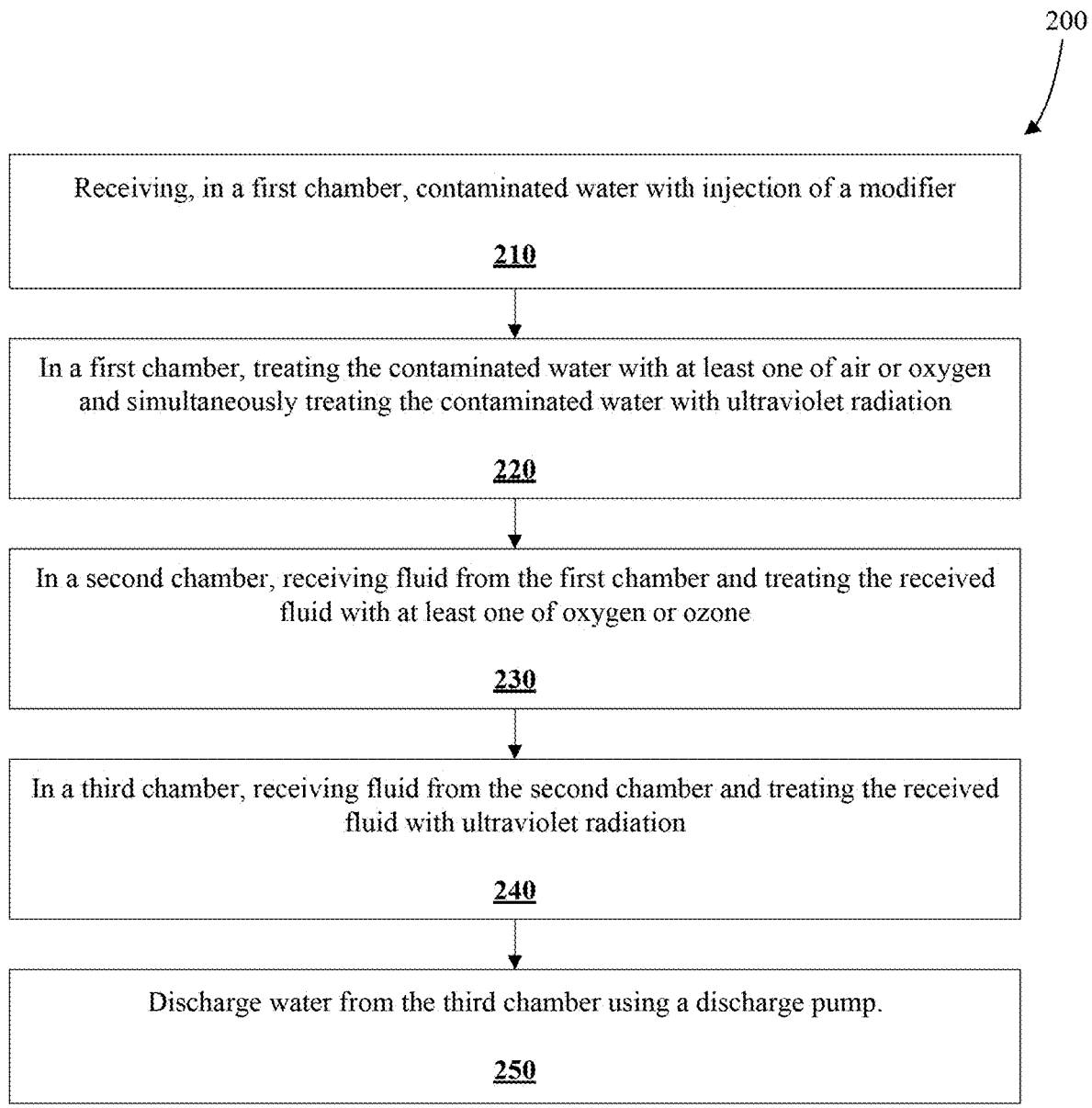
FIG. 2 is a flowchart outlining a method for treating contaminated water according to an example embodiment.

The operation of system 100 will now be described with reference to a method 200. A flowchart of the method 200 is shown in FIG. 2. The method 200 may be for removing various specific contaminants from contaminated water.

In this embodiment, the first chamber 110 of the system 100 receives contaminated water from a water source 113. The method begins when contaminated water from the water source 113 is modified with a modifier received from the injection modifier source 111 to initiate and/or catalyse reactions in the first chamber 110 (step 210).

In the first chamber, the modified contaminated water is treated with at least air or oxygen and is simultaneously treated with ultraviolet radiation (step 220). The reaction time for fluid in the first chamber 110 is varied to the specific contaminants being treated and may be, for example, twenty (20) minutes.

The contaminated water is pumped from the water source 113 to the first chamber 110 where it is treated with air and/or oxygen ($O_2$) provided by the air source 118 and/or air source 150 to the venturi unit 114 of the recirculation pump system 112. The contaminated water is also treated by the ultraviolet radiation source 116. The recirculation pump system 112 recirculates the contaminated water/fluid within the first chamber 110. The plurality of moving bed biofilm reactor membranes 115 increase the reaction between the fluid and the dissolved oxygen ($O_2$) and/or ozone ($O_3$).

In a second chamber, fluid is received from the first chamber and the received fluid is treated with at least one of oxygen or ozone (step 230). In this embodiment, the fluid received from the first chamber is in a partial-treated state whereby the fluid is saturated with oxygen ($O_2$) and/or ozone ($O_3$). Fluid from the first chamber 110 is pumped to the second chamber 120 where it is further treated with oxygen ($O_2$) and/or ozone ($O_3$) provided by the air source 150 to the venturi unit 124 of the recirculation pump system 122. The plurality of moving bed biofilm reactor membranes increase the reaction between the fluid and the oxygen ($O_2$) and/or ozone ($O_3$). The reaction time for fluid in the second chamber 120 is varied to the specific contaminants being treated and may be, for example, twenty (20) minutes.

In a third chamber, fluid is received from the second chamber and treated with ultraviolet radiation (step 240). In this embodiment, the fluid received from the second chamber is oxidized fluid. Fluid from the second chamber 120 flows to the third chamber 130 where it is treated with the ultraviolet radiation using the ultraviolet radiation source 136 to complete the chemical reactions and pathogen removal. The recirculation pump system 132 recirculates the fluid within the third chamber 130 to increase the reaction between the fluid and hydroxyl radicals generated by the ultraviolet radiation source 136. The reaction time for fluid in the third chamber 130 is varied to the specific contaminants being treated and may be, for example, twenty (20) minutes.

In one or more embodiment, within the third chamber, reactions may include polishing reactions such as for example disinfection to meet discharge criteria.

The water and accumulated vapours are discharged from the third chamber using a discharge pump (step 250). The discharge pump 140 delivers the treated water and accumulated vapours out of the third chamber 130. The water and vapours may be discharged to the surrounding environment or to a storage tank such that the water can be utilized for various purposes.

The system 100 and method 200 described above establish in-field remote oxidation treatment of contaminated water that limits reliance on the use of chemicals and the potential generation of harmful compounds to the environment.

The system 100 treats the contaminated water in-situ and may operate continuously at a flow rate of up to 3 $m^3$/minute. In one example, the system is able to target the reduction of $H_2S$ concentration in the contaminated water from 100.0 mg/l to 5.0 mg/l. In another example, the system is able to reduce Dissolved Organic Compounds (DOC) and other contaminants based on their individual chemical oxidation kinetics.

As noted, certain adaptations and modifications of the described embodiments can be made. Therefore, the above discussed embodiments are considered to be illustrative and not restrictive.

What is claimed is:

1. A method for treating contaminated water, the method comprising:
    receiving, in a first chamber, contaminated water with injection of a modifier;
    in the first chamber, treating the contaminated water with at least one of air or oxygen, and simultaneously treating the contaminated water with ultraviolet radiation;
    in a second chamber, receiving fluid from the first chamber and treating the received fluid with at least one of oxygen or ozone and utilizing a plurality of moving bed biofilm reactor membranes to increase reaction between contaminants in the fluid and the at least one of oxygen or ozone;
    in a third chamber, receiving fluid from the second chamber and treating the received fluid with ultraviolet radiation; and
    discharging water from the third chamber using a discharge pump.

2. The method of claim 1, further comprising:
    generating the at least one of oxygen and ozone from air exterior of the first, second and third chambers using oxygen enrichment with ozone generation.

3. The method of claim 1, wherein the ultraviolet radiation used in the first chamber is UVC radiation defined for contaminants to be treated.

4. The method of claim 1, further comprising:
    recirculating the contaminated water after injection of the modifier and the at least one of air or oxygen within the first chamber using a first recirculation pumping system.

5. The method of claim 4, wherein the first recirculation pumping system includes a venturi unit.

6. The method of claim 1, further comprising:
    recirculating the fluid and the at least one of oxygen or ozone within the second chamber using a second recirculation pumping system.

7. The method of claim 6, wherein the second recirculation pumping system includes a venturi unit.

8. The method of claim 1, wherein the ultraviolet radiation used in the third chamber is UVC radiation defined for contaminants to be treated.

9. The method of claim 1, further comprising:
    recirculating the fluid within the third chamber using a third recirculation pumping system.

10. A system for treating contaminated water, the system comprising:
    a source of at least one of air, oxygen or ozone;
    first, second and third chambers, the first and second chambers fluidly connected to the source of at least one of air, oxygen or ozone;

the first chamber comprising an inlet to receive contaminated water with an injection of a modifier from a source and an outlet to discharge fluid to a second chamber;

the second chamber comprising an inlet to receive fluid from the first chamber and an outlet to discharge fluid to the third chamber;

the third chamber comprising an inlet to receive fluid from the second chamber and an outlet to discharge fluid to a discharge pump;

a first ultraviolet radiation source positioned external to fluid recirculation of the first chamber to treat contaminated water contained therein;

a second ultraviolet radiation source positioned external to fluid recirculation of the third chamber to treat fluid contained therein; and a plurality of moving bed biofilm reactor membranes positioned within the second chamber to increase reaction between the fluid and at least one of oxygen or ozone.

11. The system of claim 10, wherein the source of at least one of air, oxygen or ozone comprises an oxygen generator unit and an ozone generator.

12. The system of claim 10, wherein the first ultraviolet radiation source emits UVC radiation.

13. The system of claim 10, wherein the second ultraviolet radiation source emits UVC radiation.

14. The system of claim 10, further comprising:
a first recirculation pumping system positioned to recirculate the contaminated water and at least one of air or oxygen within the first chamber.

15. The system of claim 14, further comprising:
a plurality of moving bed biofilm reactor membranes positioned within the first chamber to increase reaction between the fluid and the at least one of air or oxygen.

16. The system of claim 10, further comprising:
a second recirculation pumping system positioned to recirculate the fluid and at least one of oxygen or ozone within the second chamber.

17. The system of claim 10, further comprising:
a third recirculation pumping system positioned to recirculate the fluid within the third chamber.

18. The system of claim 10, further comprising:
the discharge pump fluidly connected to the third chamber to discharge at least one of water or accumulated vapours therefrom.

* * * * *